343-756

CROSS REFERENCE SEARCH ROOM

Dec. 14, 1965 D. F. BOWMAN 3,223,948

ORTHOGONAL MODE HYBRID JUNCTION AND CIRCUIT THEREFOR

Filed July 26, 1962 5 Sheets-Sheet 1

E-PLANE TEE

H PLANE TEE

INVENTOR.
DAVID F. BOWMAN

BY

OSTROLENK, FABER, GERB & SOFFEN
ATTORNEYS

ORTHOGONAL MODE HYBRID JUNCTION AND CIRCUIT THEREFOR

Filed July 26, 1962 5 Sheets-Sheet 2

INVENTOR.
DAVID F. BOWMAN
BY
OSTROLENK, FABER, GERB & SOFFEN
ATTORNEYS

ORTHOGONAL MODE HYBRID JUNCTION AND CIRCUIT THEREFOR

Filed July 26, 1962 5 Sheets-Sheet 3

INVENTOR.
DAVID F. BOWMAN
BY
OSTROLENK, FABER, GERB & SOFFEN
ATTORNEYS

INVENTOR.
DAVID F. BOWMAN
BY
OSTROLENK, FABER, GERB & SOFFEN
ATTORNEYS

INVENTOR.
DAVID F. BOWMAN

BY

OSTROLENK, FABER, GERB & SOFFEN
ATTORNEYS

3,223,948
ORTHOGONAL MODE HYBRID JUNCTION AND CIRCUIT THEREFOR

David F. Bowman, Wayne, Pa., assignor, by mesne assignments, to Washington Aluminum Co., Inc., Baltimore, Md., a corporation of Delaware Filed July 26, 1962, Ser. No. 212,678
14 Claims. (Cl. 333—9)

My invention relates to a high performance microwave apparatus, and more particularly to a novel hybrid junction structure and a tunable diplexer circuit utilizing such a hybrid junction to obtain increased band width, impedance matching and equipment isolation.

The use of microwave equipment is well established in many long range communications systems. The manner in which such short wave-length signals propagate through space has made possible such broad fields of investigation as radar, radio-telescopy, tropospheric scatter communication and space communication. In such systems a particularly desirable and well known circuit assembly for efficient utilization of equipment is a common antenna for both the transmitter and receiver. Such a circuit typically includes a diplexer to selectively interconnect those components to the antenna for simultaneous operation of the receiver and transmitter at their respective frequencies. The diplexer is designed to establish the requisite channels between the receiver and transmitter to the common antenna at their respective frequencies, while maintaining isolation between those components at the other equipment's operating frequency. That is, where the transmitter and receiver are designed to simultaneously operate at different frequencies, a direct channel is established between the common antenna and the receiver at the receiver frequency; likewise, a similar channel is established between the transmitter and the common antenna at the transmitter frequency. A high degree of isolation is maintained between the receiver and transmitter; between the common antenna and the transmitter at the receiver frequency; and between the common antenna and the receiver at the transmitter frequency.

It is often desirable to provide for a frequency adjustment of the transmitter and/or receiver channels established in the diplexer. In particular, the recent advent of tropospheric scatter communication has presented the need for a high performance tunable (frequency changeable) diplexer to operate at high power levels within its assigned microwave region. Although numerous diplexers are presently known in the art for microwave application, none of these exhibit the tunability, power handling, channel isolation, and band-width capabilities of my invention.

Accordingly, my invention has found particularly advantageous use in tropospheric scatter communications, wherein links between various geographical locations on the earth's surface have been assigned a different sub-band of channel communication within the overall spectrum. Typically, whereas the link from Spain to England might operate between 860 and 866 megacycles, the return link between these two stations could be operating between 960 and 966 megacycles. For efficiency of design and operation, it is desirable that each station's equipment be standardized to permit operation in either direction of transmission, or at any other one of the tropospheric scatter links. This is permitted by my invention, which allows a selective adjustment of the diplexer channels within the broader overall troposcatter communication spectrum to adapt the equipment to a particular link.

As is well known in the art, the very characteristics which make microwave signals particularly desirable for free space communication oftentimes complicate their local transmission. That is, the conduction of such signals must be effected in wave guides or coaxial lines because of the tendency of higher frequency electromagnetic energy to propagate and radiate away into space. If an attempt is made to convey energy of such frequencies from one place to another along an open wire transmission line, most of the energy will radiate into space before reaching its destination.

To avoid this radiation loss, a hollowed pipe or wave guide is used. At such high frequencies, the skin effect will limit the flow of current to the inner surfaces of the walls. Alternatively, where a coaxial line is used the current flow is similarly limited to the outer surface of the inner coaxial conductor. The energy penetrates only a slight depth, and if the metallic wall is thick enough, will not reach the opposite side. At microwave frequencies, the thickness of the layer where all the current is concentrated is extremely small, and any practical thickness of wall is sufficient to prevent escape of energy. Thus, practically all of the energy will reach its destination, with the slight loss due to finite conductivity of the metal wall, corresponding to the ohmic loss of lower frequency transmission lines.

Microwave energy is associated with an electromagnetic field and its propagation in a waveguide must satisfy certain mathematical conditions as set forth in Maxwell's equations. The satisfaction of these requirements result in particular geometrical configurations of varying electric and magnetic field capable of existing in a particular waveguide; each such configuration being known as a mode. Each mode can propagate through a waveguide only if its frequency is higher than a particular cut-off value. This value will depend upon the geometric configuration of the electromagnetic field and the waveguide's dimensions. The mode having the lowest cut-off frequency for a particular rectangular wave guide is nomenclated the $TE_{10}$ mode, with the symbolic representation being well known in the art.

Most commercially available standard waveguides are of generally rectangular cross-section having a 2:1 ratio between their long and short walls; this ratio being termed the "aspect" ratio. In such a waveguide, the cut-off wave length for the dominant $TE_{10}$ mode will be twice the long dimension. The cut-off wave length for the orthogonally related $TE_{01}$ mode is equal to twice the short dimension of such a guide. Should it be desirable to support the orthogonally related $TE_{10}$ and $TE_{01}$ modes in a single wave guide having equal cut-off modes, a square wave guide may be used, having its sides equal to the long dimension of the 2:1 aspect ratio rectangular waveguide designed for dominant mode propogation.

To interconnect various waveguides at a common junction, it is well known to use a hybrid structure. A hybrid junction possesses many of the qualities of a bridge, and when properly matched, effects power division and isolation between certain of its waveguide ports. A particularly well-known type of hybrid junction is the Magic Tee, wherein four waveguide channels intersect to form an E–H junction having common arms. The tees are matched by the inclusion of appropriate impedance compensating elements to provide inherent balance. Each guide is preferably designed to support only the dominant mode of the propagated energy. A wave signal entering the leg of the E-plane Tee will divide into two oppositely phased signals in the common arms. The leg of the H plane Tee is so orientated with respect to the E plane signals that it is unable to support the dominant mode thereof; hence none of the energy introduced into the leg of the E plane Tee will be present in the leg of the H plane Tee in a well matched hybrid junction. Similarly, energy entering the leg of the H plane Tee will split up into two equal in-phase components within the common arms, and be isolated from the leg of the E plane Tee in a well matched hybrid junction.

The limitations of most presently available diplexers preventing high performance, tunable operation are imposed by the hybrid junctions used to interconnect the various channels. My invention utilizes a novel hybrid junction to obtain improved performance requirements in a diplexer circuit, and in particular, a diplexer circuit having tuning capabilities.

Briefly, the tunable diplexer of my invention interconnects and selectively couples to orthogonally related energy propagated therethrough. The hybrid junction includes a high performance dual polarization transition which may typically be of the types shown in my copending United States Patent applications (A–77) Serial No. 6,036, filed February 1, 1960, now Patent No. 3,150,333, entitled "Microwave Twin-Tee Horn," and Serial No. (A–108) 166,205, filed January 15, 1962, entitled "Microwave Signal Transfer Apparatus," both of which are assigned to the assignee of the instant invention. The dual polarized signal emerging from the signal combining end of the transition is presented to a connecting guide which permits selective coupling to orthogonally related resolved components of the combined signal polarized at 45 degrees with respect to the input signals. This may be effected by a 45 degree twist in the dual polarization transition itself, or by an auxiliary waveguide twist section connected to the output of the dual polarized transition, and constructed in accordance with a manner well known in the art.

It is also possible to couple to such resolved components of the signal through opposite corners of a guide that is not twisted 45 degrees with respect to the input signal. Such coupling, however, tends to initiate the generation of undesirable higher modes.

The orthogonally related resolved signals which are rotated 45 degrees with respect to the orthogonal inputs may be analogized to the relationships existing in a Magic Tee hybrid junction. That is, one of the input components will have equal in-phase components in the 45 degree resolved signals, and the other input signal will have out-of-phase components in the 45 degree resolved components. It has been found that the performance achieved with a hybrid junction constructed in this manner is considerably improved over that which may be realized from presently available hybrid junctions of the four individual port variety.

The particular diplexer configuration I show utilizing my improved hybrid junction structure selectively couples a resonant circuit to each of the 45 degree resolved components established between the receiver and transmitter arms of the diplexer. These resonant circuits preferably couple to each of the orthogonally related components at a quarter wave separation of the paths and are adjusted to reflect energy at one of the equipment's frequency, but transmit energy at the other equipment's frequency. In a preferred embodiment, a filtering circuit similarly constructed is provided at the receiver and transmitter arms of the diplexer to effect further isolation, and to obtain increased rejection of harmonic frequencies.

Accordingly, my invention utilizes an improved hybrid junction to provide a high performance tunable diplexer at microwave frequencies having increased band width, equipment isolation and impedance matching over any of the devices presently existing.

It is, accordingly, a primary object of this invention to provide a high performance tunable diplexer for the microwave region.

Another object of this invention is to provide a microwave diplexer circuit, including an interconnected array of improved three-port dual-polarized hybrid junctions.

A further object of this invention is to provide an improved diplexer circuit having interconnecting hybrid junctions wherein the input signals are orthogonally related and are combined into a single channel having orthogonally related components resolved 45 degrees with respect to the input signals.

An additional object of this invention is to provide a tunable microwave diplexer circuit having an interconnected array of dual polarized three-port hybrid junctions wherein the common ports are interconnected and are selectively coupled to orthogonally related resonant circuits.

Still another object of this invention is to provide a microwave diplexer circuit with improved filtering, constructed of an interconnected array of three-port hybrid junctions wherein the third port contains orthogonally related signals introduced at the other ports, and tunable resonant circuits selectively coupled to resolved components of the introduced orthogonal signals.

Still a further object of this invention is to provide a microwave diplexer circuit including a plurality of improved three-port dual-polarized hybrid junctions and interconnecting waveguide sections twisted 45 degrees thereto and adapted to permit coupling to resolved components of the hybrid junction input signals.

Still an additional object of this invention is to provide a microwave diplexer circuit constructed of an improved dual polarized hybrid junction and an interconnected waveguide section twisted 45 degrees thereto, and adapted to provide quarter wave staggered frequency selective coupling to resolved components of the receiver and transmitter signals.

These as well as other objects of my invention will readily become apparent after reading the following description of the accompanying drawings in which:

FIGURE 1 schematically illustrates the tunable diplexer and filter constructed in accordance with my invention.

FIGURE 2 schematically illustrates the diplexer portion of FIGURE 1.

FIGURE 3 schematically illustrates the filter portion of FIGURE 1.

FIGURE 4 is a typical frequency characteristic of the resonant coupling means of my invention.

FIGURE 5 generally illustrates a hybrid junction of the prior art.

FIGURES 5*a* and 5*b* schematically show the wave signal combination within the E-plane Tee and H-plane Tee, respectively of the hybrid junction of FIGURE 5.

FIGURES 6 and 6*a* generally illustrate the hybrid junction wave signal combination of my dual polarized improved hybrid junction.

Figure 1:
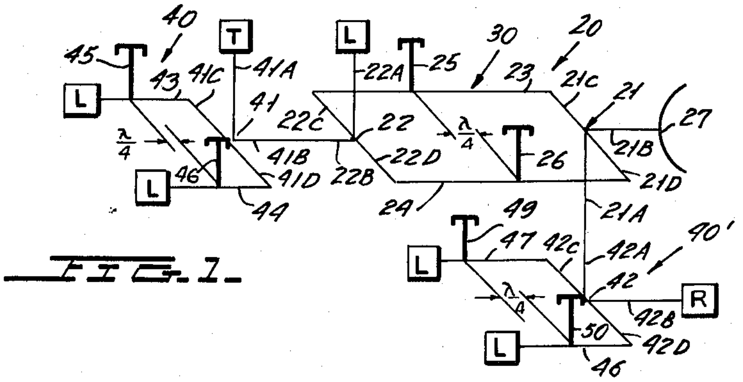
Figures 2, 3:
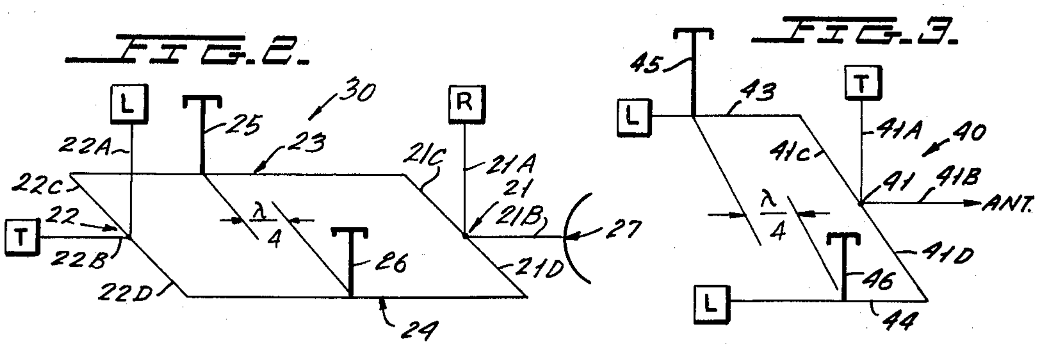

Referring to the figures, and specifically FIGURES 1 through 3, diplexer filter 20 contains a diplexer portion 30, as shown in FIGURE 2, and two filter portions 40, 40′, as shown in FIGURE 3. For purposes of explaining the operation of my invention, each of the hybrid junctions 21, 22, 41 and 42 are shown as four-port devices, with it being understood that my improved hybrid junction combines two of the individual ports into a common waveguide.

Referring to FIGURE 2, hybrid junctions 21 and 22 contain balanced ports A, B, C and D, with arm ports C and D being connected together by wave guide sections 23, 24, respectively. Receiver R is connected to port 21A, transmitter T is connected to port 22B, common antenna 27 is connected to port 21B, and a well-matched dummy load L is connected to port 22A. Resonant circuits 25 and 26 are coupled to connecting waveguides 23 and 24 respectively, with the longitudinal placement of the coupling thereto being separated by a quarter wave length of the receiver frequency within the guide. Resonant circuits 25, 26 are adjusted to substantially reflect energy at the receiver frequency and substantially transmit energy at the transmitter frequency. This can be effected by adjusting these circuits to be either a band stop resonant circuit at the receiver frequency or a band pass resonant circuit at the transmitter frequency, as will be discussed below in conjunction with FIGURE 4.

To illustrate the diplexing operation of FIGURE 2, assume first a wave signal at the receiver frequency to enter the antenna port 21B of hybrid junction 21. As will be more fully explained below in conjunction with FIGURE *5b*, this signal will be divided into two equal in-phase waves in H-plane arm ports 21C, 21D. Each of these waves is reflected by resonance circuits 25, 26 adjusted to reflect the receiver frequency. Because of the quarter wave staggering of resonant circuits 25, 26 the reflected signals re-entering hybrid junction 21 will be out of phase in arms 21C, 21D. As will be discussed in conjunction with FIGURE *5a*, such signals recombine in the hybrid junction E-plane Tee to form a wave emerging from the receiver port 21A. The out-of-phase reflected waves will cancel each other at the antenna port 21B, thereby preventing reflected energy from reaching the antenna.

Should a small portion of the original receiver frequency signal be transmitted past resonant circuits 25, 26, these in-phase portions would combine in the H-plane arm E of hybrid junction 22 to present a low amplitude wave at that point. Should this wave be reflected again into the combining circuit, it would act as a wave originating in the transmitter. Such reflected wave would have two equal in-phase components in arms 22C, 22D, which would be reflected by quarter wave staggered resonant circuits 25, 26. This reflected out-of-phase energy now presented to hybrid junction 22 will combine in E-plane port 22A, wherein it is preferably presented to dummy load L to be dissipated. The small portion of the waves that pass the resonators 25, 26 will be in phase when they reach hybrid junction 21 and will thereby combine in antenna port 21B to introduce a low amplitude reflected signal thereto.

At the transmitter frequency, a wave entering H-plane Tee port B of hybrid junction 22 is divided into two equal in-phase waves that are substantially transmitted by resonators 25, 26, adjusted to pass the transmitter frequency. The transmitted waves are then presented in phase to hybrid junction 21, wherein they combine in the H-plane Tee antenna port 21B. The in-phase components of this signal will cancel in receiver E-plane Tee port 21A. The small portions of the waves which might be reflected by quarter wave staggered resonant circuits 25, 26 are reflected out of phase to hybrid junction 22, wherein they combine to form a wave dissipated in dummy load L. Thus, it is seen that FIGURE 2 provides a circuit wherein the main receiver frequency energy from the antenna is coupled to the receiver and isolated from the transmitter, and the transmitter frequency is coupled to the antenna and isolated from the receiver.

Increased isolation may be obtained by the addition of other resonant circuit pairs in the dual paths. A preferable way of obtaining increased isolation in a complete diplexing network is to add portions of the above-described circuit at the receiver and transmitter terminals, as shown by 40, 40'. In addition to providing for increased isolation, such a circuit will also serve to effectively reject harmonic frequencies.

Referring to FIGURE 3 which shows such a circuit 40 for the transmitter arm, hybrid junction 41 has its H-plane port 41B connected to terminal 22B of the diplexer network, as shown in FIGURE 2. Transmitter T is connected to the E-plane Tee arm 41A of hybrid junction 41, and common arms C and D are connected to waveguide sections 43, 44, containing resonant circuits 45, 46. Resonant circuits 45, 46 are constructed similarly to circuits 25, 26 of FIGURE 2, but are adjusted to reflect the transmitter frequency and transmit the receiver frequency. Waveguides 43, 44 are terminated with dummy loads L, which may be similar to dummy load L of diplexer hybrid junction arm 22A.

The signal presented to hybrid junction 41 by transmitter T is divided into two equal out-of-phase components in arms 41C and 41D, which will be reflected by resonant circuits 45 and 46. The quarter wave staggered resonant circuits 45, 46 will present in-phase reflected components to hybrid junction arms 41C, 41D, which will thereby combine in H-plane Tee arm 41B and be presented to port 22B of diplexer 30. Inasmuch as resonant circuits 45, 46 can be designed to substantially transmit all important harmonic frequencies of the transmitter, energy at such frequencies will thereby be dissipated in the load and not be presented to the diplexer circuit.

Also referring to FIGURE 1, it is seen that the portion of the receiver frequency signal which is transmitted by resonant circuits 25, 26 will be transmitted to diplexer hybrid junction terminal 22B and then be presented to filter hybrid junction terminal 42B, wherein they will be presented to ports 41C and 41D. These signals will be substantially transmitted past resonant circuits 45, 46 and be absorbed in loads L at the terminus of waveguides 43, 44. Thus, hybrid filter circuit 40 provides both additional isolation between the receiver and transmitter arms of the diplexer, and increased harmonic frequency rejection at the transmitter arm.

The filter circuit 40' at the receiver portion of the diplexer is constructed similarly to filter circuit 40, with it being understood that quarter wave staggered resonant circuits 49, 50 will be adjusted to reflect the receiver frequency energy and transmit the transmitter frequency energy.

Figure 4:
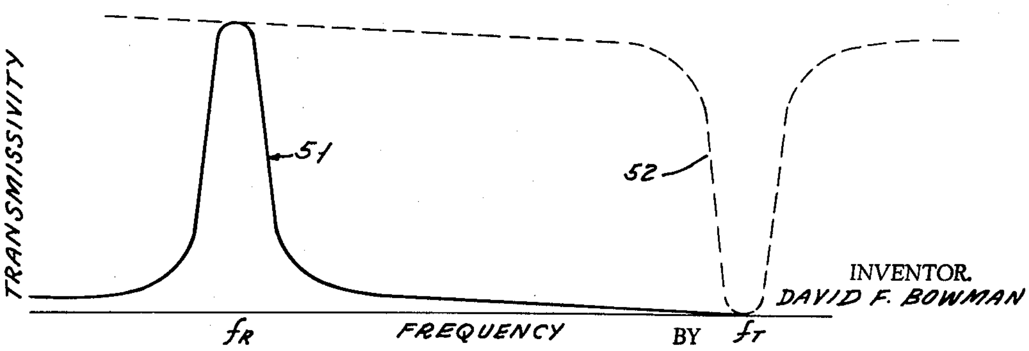

FIGURE 4 typically illustrates the frequency characteristics of the resonant coupling circuits such as 25 and 26 of the diplexer portion. These circuits substantially reflect the energy at the receiver frequency while substantially transmitting the energy at the transmitter frequency. This may be achieved by a band pass filter resonant at the receiver frequency $F_R$, as shown by curve 51. Alternatively, resonant circuits 25 and 26 may comprise a band stop filter resonant at the transmitter frequency $F_T$, as shown by curve 52. Likewise, resonant circuits 49 and 50 in the receiver filter arm will have frequency characteristics corresponding to those shown in FIGURE 4. Similarly, resonant circuits 45, 46 in the transmitter filter arm will have the converse characteristics: that is, they may be either a band stop filter resonant at the receiver frequency, or a band pass filter resonant at the transmitter frequency.

Figure 5:
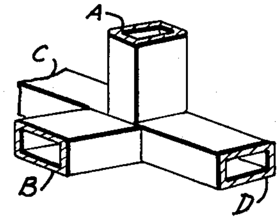
Figure 5A:
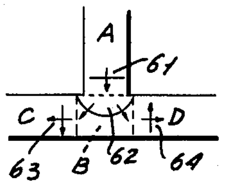
Figure 5B:
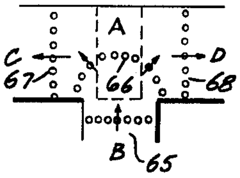

Reference is now made to FIGURES 5, *5a* and *5b* to illustrate the signal combination of a Magic Tee hybrid junction. The interconnected arms A, B, C, D are constructed of similar wave guides and proportioned to transmit only the dominant mode of similar frequency bands, with the electric vector thereof perpendicular to the larger dimension of the guide. Arms A, C, D constitute an E-plane Tee as shown in FIGURE 5*a*, and arms B, C, D constitute an H-plane Tee as shown in FIGURE 5*b*. Because of the symmetry involved, and also the polarity discrimination inherent in a guide of these proportions, energy introduced at port A will divide equally between C and D, with none of this energy appearing at port B. Similarly, energy introduced at port B will divide equally between ports C and D with none of that energy being presented to port A. If the ports are not identically matched, the reflected waves will not be identical, and there will be an output at the opposite Tee port, proportional to the difference between the waves reflected at C and D.

Referring to the E-plane junction shown in FIGURE 5*a*, it will be seen that a particular line of force 61 in a representative wave front arriving from arm A may assume a position 62 and later appear as two oppositely directed lines of force 63 and 64 in the adjacent arms C and D. The two component wave fronts are out of phase in the direction proceeding towards the port opening. Also, because of the proportions of arm B, shown dotted, it is unable to support any component line of force which front 62 might normally generate. Thus, little or no energy introduced at port A can flow through port B. Referring now to FIGURE 5*b*, which shows the H-plane junction, it will be seen that the lines of electric force in a representative wave front 65 arriving from arm B may first assume a position 66 and later appear as two component wave fronts 67 and 68. Wave fronts 67 and 68 are in the same relative phase. Guide A, shown dotted, is so orientated with respect to the wave front 65 that it is unable to support energy introduced thereby.

To achieve the above-described wave combination in a satisfactory manner, it is necessary that the junctions of the hybrid be well matched over a broad frequency band to effect the requisite equal energy splitting between the arms without a large reflection in the input arm. Within the frequency spectra presently assigned for tropospheric scatter communication (e.g. 755–985 megacycles), the presently available hybrid junctions (including the Magic Tee) do not perform sufficiently well to permit a high performance tunable diplexer operation in accordance with the circuit configuration of FIGURES 1–3.

My invention provides a novel hybrid junction particularly adaptable for use in this frequency range for providing high performance diplexer action.

Figures 6, 6A, 10:
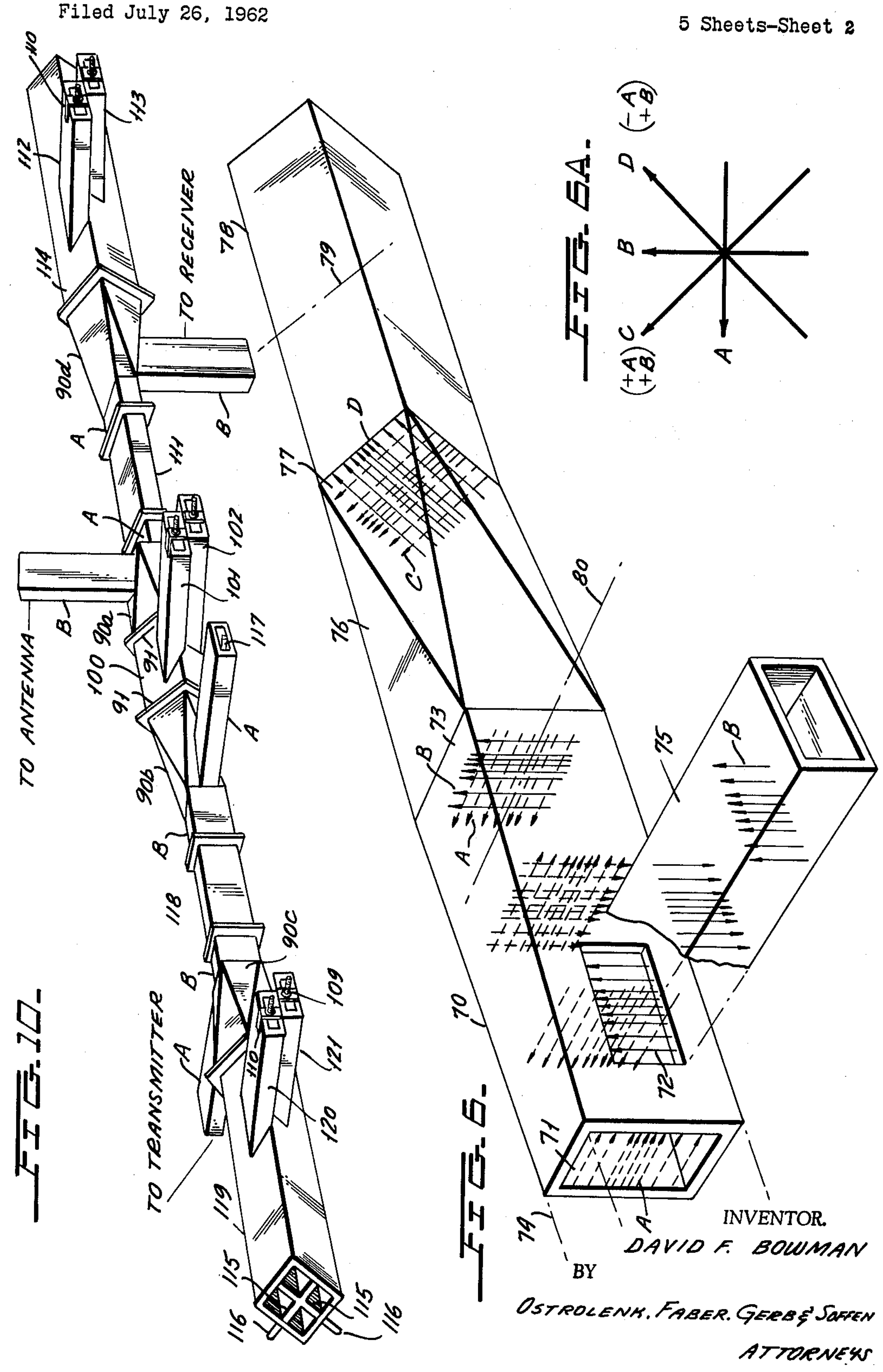
FIGURE 10 is a perspective view of a diplexer filter constructed in accordance with my invention.

Reference is now made to FIGURES 6 and 6*a* which illustrate the basic operation of my improved hybrid junction. The hybrid junction includes a dual polarized transition which is illustratively shown to be of the type set forth in my aforementioned copending U.S. application Serial No. 166,205.

Alternatively, other high performance dual polarized transition may be employed such as that described in my other aforementioned copending U.S. application Serial No. 6,036. Transition 70 contains two input ports 71 and 72 and an output port 73. Input ports 71 and 72 introduce signals A and B respectively into a common enclosure terminated by output port 73. Signals A and B are of the same frequency and are orthogonally related in space. These signals combine within transition 70 to present a dual polarized composite signal A–B at terminus 73. Conversely, a dual polarized signal A–B introduced to transition 70 at opening 73 will split up into its two orthogonally related components A and B which will appear at ports 71 and 72 respectively. Hence, it is seen that transition 70 is a reciprocal waveguide device for either combining or separating orthogonally related signals. These signals may be introduced to transition 70 by separate waveguide sections 74 and 75 respectively, each proportioned to transmit the dominant mode of the same frequency band. Alternatively, either or both of these signals may be introduced to transition 70 by a coaxial cable input, in the manner well known in the art. This latter alternative, however, usually involves undesirable compromises on the impedance bandwidth or on the power-handling capability of the channel.

Port 73 of dual polarized transition 70 is connected to a twist section of waveguide 76 having oppositely located port 77 rotated 45 degrees with respect to port 73. Waveguide section 78 connected to port 77 of twist section 76 is orientated in the same manner as port 77; hence, the transverse axis 79 of wave guide section 78 is rotated 45 degrees with respect to the transverse axis 80 of transition emergent port 73. Wave signal A–B transmitted to waveguide 78 may be resolved into two orthogonally related components C and D respectively parallel and perpendicular to the transverse axis 79 of that guide.

Reference is now made to FIGURE 6*a* which illustrates the vector relationship of the resolved signal components in waveguide 78, with the arrowheads indicating the arbitrarily assigned direction of positive sense. Resolved signal C consists of the positive or in-phase components of signals A and B presented to transversely rotated waveguide 78. Resolved signal D consists of the negative, or out-of-phase, component of signal A and the positive or in-phase component of signal B. Thus, signal A presented to the hybrid junction will be resolved into out-of-phase components in arms C and D; and signal B presented to the hybrid junction will resolve itself into in-phase components in arms C and D.

Referring back to FIGURES 5, 5*a* and 5*b*, it is seen that the relationship shown in FIGURE 6 is analogous thereto with the waveguides of channels C and D being combined into the single channel of wave guide 78. It has been found that the hybrid junction of my invention wherein two symmetrical arms are contained within the same waveguide results in a more compact EH junction, yielding improved performance over the presently available hybrid junction, such as the "Magic" tee.

Figures 7, 7A, 7B, 7C, 7D, 7E:
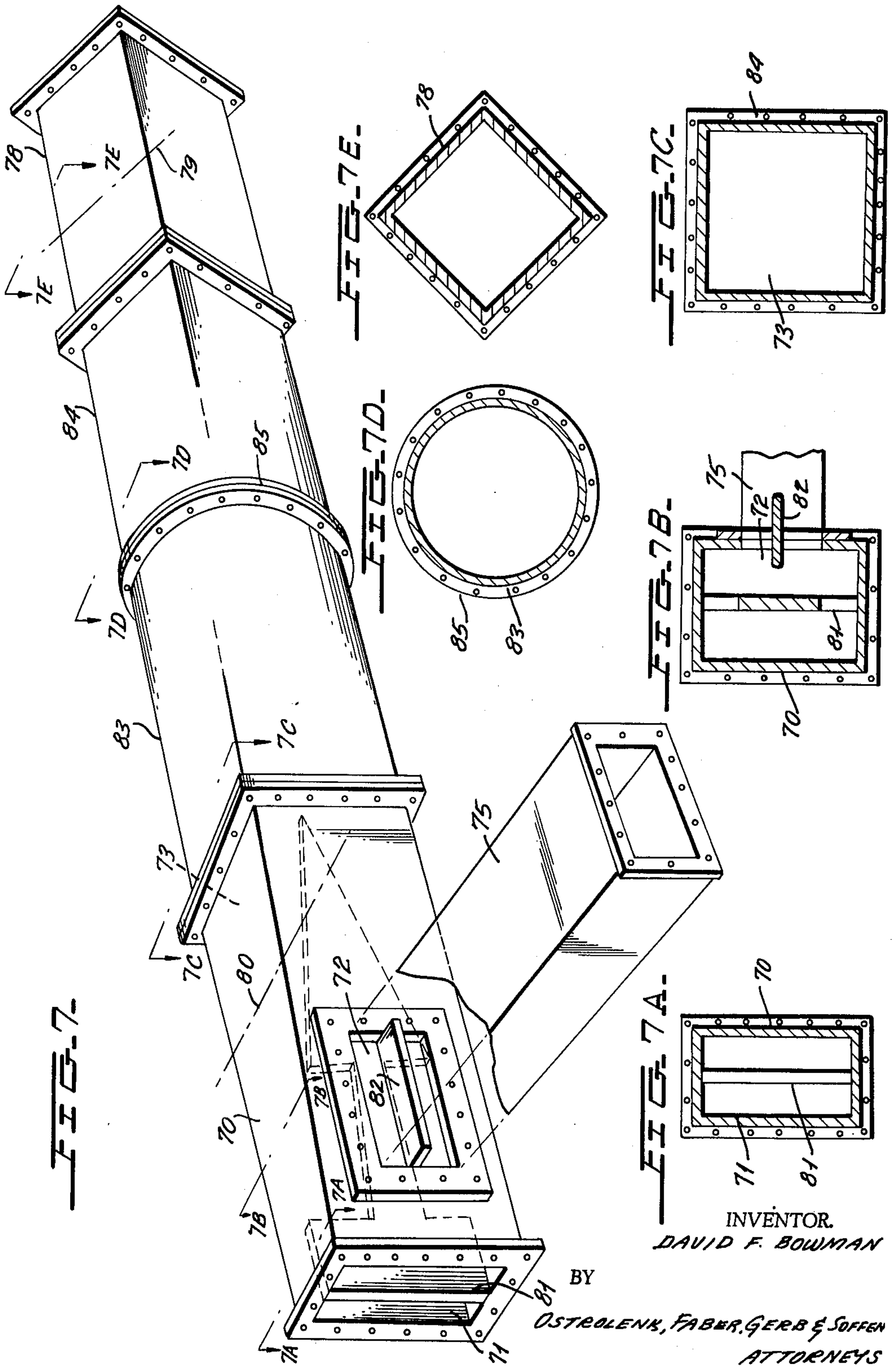
FIGURE 7 shows a hybrid junction constructed in accordance with my invention and utilizing auxiliary waveguide twist sections to effect the requisite 45 degree waveguide rotation.
FIGURES 7A to 7D show different cross-sectional views of FIGURE 7.

FIGURE 7 depicts the physical realization of the hybrid junction generally shown in FIGURE 6. The dual polarized transition 70 contains a central ridgelike member 81, which may be of the general spear-shape shown. Alternatively, it may be of a somewhat different spear shape, or may include two individual ridges, as shown in my above-noted copending U.S. patent application Serial No. 166,205. Septum plate 82 provides an improved impedance match at the junction of waveguide 75 and transition 70 for the wave of waveguide 71. To minimize the signal reflections in the twist waveguide, the single section 76 of FIGURE 6 has been replaced with two waveguide connections 83 and 84 respectively. Connection 83 connects the square output port 73 to round port 85. Connection 84 couples from round port 84 to square waveguide section 78, having its transverse axis 79 tilted 45 degrees with respect to the transverse axis 80 of transition 70. Cross-sections 7A through 7E illustrate the manner in which the twisting of the waveguide is effected. Alternatively, various other waveguide transitions well known in the art may be used to obtain this 45 degree relationship.

Figure 8:
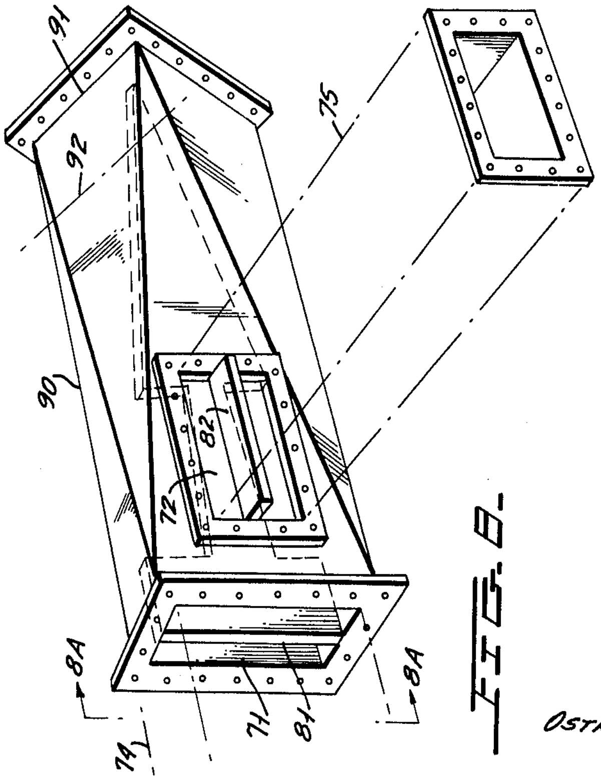
FIGURE 8 illustrates a preferred hybrid junction in accordance with my invention wherein the requisite 45 degree rotation is effected by a waveguide twist integral with the dual polarized transition.
Figure 11:
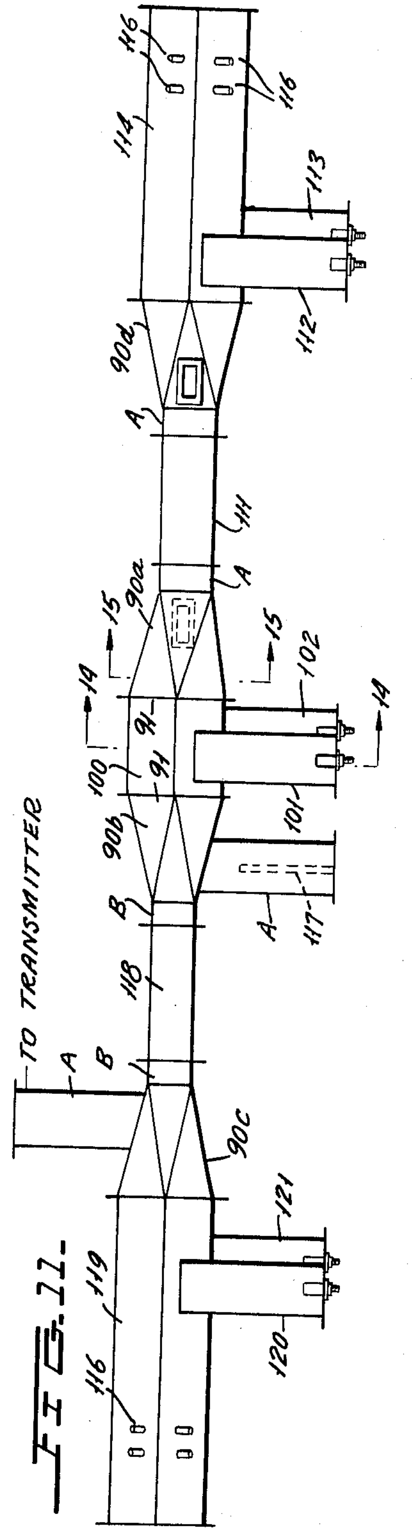
FIGURE 11 is a side view of the diplexer filter of FIGURE 10.
Figure 12:
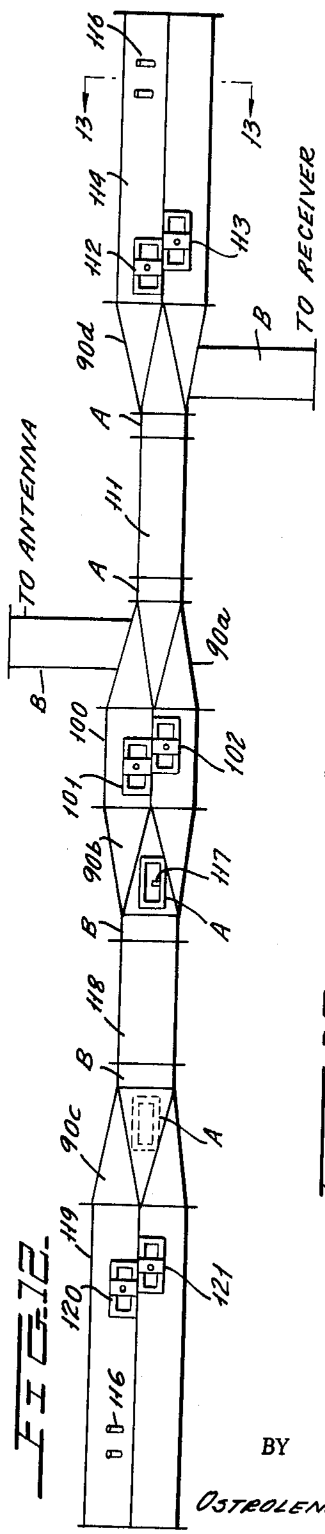
FIGURE 12 is a plan view of the diplexer filter of FIGURE 10.
Figure 15:
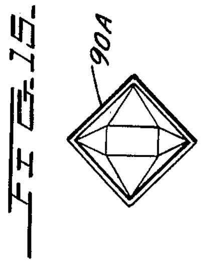
FIGURES 13, 14 and 15 are cross-sectional views of the diplexer filter of FIGURES 10–12, as shown by the dotted lines of FIGURES 11 and 12 and looking in the direction of the respective arrows.

FIGURE 8 is a preferred embodiment of the hybrid of my invention wherein the twisting of the dual polarized output signal is effected in the dual polarized transition itself. That is, transition 90 is equivalent to the combined structure of members 70, 83 and 84 shown in FIGURE 7. Output port 91 has its transverse axis 92 tilted 45 degrees with respect to the polarization of the signals introduced by waveguides 74 and 75 to dual polarized transition 90. Output port 91 is connected to a section of waveguide orientated with respect to the signals as guide 78 of FIGURE 7. Thus, output port 91 of transition 90 may be analogized to arms C and D of the Magic Tee hybrid junction, with ports 71 and 72 corresponding to ports A and B thereof.

Figure 9A:
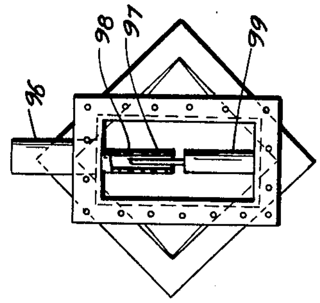
FIGURE 9A is a cross-sectional view of FIGURE 9.
Figure 9:
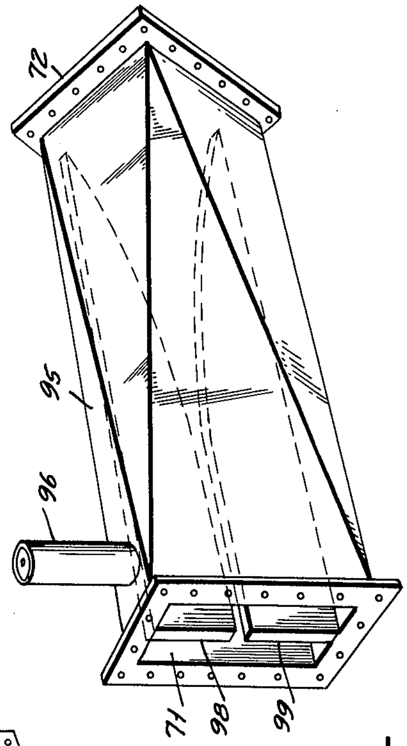
FIGURE 9 illustrates an alternate coupler of the type shown in FIGURE 8, wherein one of the inputs is a coaxial cable.

FIGURE 9 illustrates a modified embodiment 95 of my preferred coupler, wherein one of the orthogonally related inputs is presented by coaxial cable 96. This embodiment typically shows a pair of dual ridges in the central section replacing the single spear of FIGURES 7 and 8. The central conductor 97 extends through a hollowed portion of first ridge 98 and across the inter-ridge gap to second ridge 99 to couple thereto. Alternatively, other coax to waveguide transitions well known in the art may be used. The input presented to hybrid junction 95 by coaxial cable 96 corresponds to the orthogonally presented B port of the Magic Tee shown in FIGURE 5.

For uniformity of a particular diplexer hybrid circuit it might be desirable that all of the hybride junctions be of a similar construction. Hence, where some of the inputs would be presented via coaxial cable (i.e. the receiver and transmitter) and another input might be presented via waveguide (i.e. the antenna), it might be preferable from a design consideration to use the coaxial input hybrid 95 throughout. Accordingly, at the antenna port an appropriate coaxial to waveguide transition would be made, in the manner well known to the art.

Figure 14:
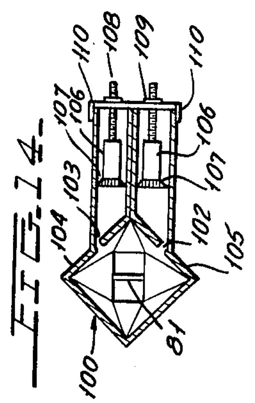

FIGURES 10 through 15 illustrate the diplexer filter circuit of FIGURE 1, constructed utilizing the improved hybrid structure of my invention. Hybrid junctions **90*a*, 90*b*, 90*c* and 90*d* correspond to hybrid junctions 21, 22, 41 and 42 respectively, as shown in FIGURE 1. These hybrid junctions are each of the type shown in FIGURE 8, but may naturally be of any of the other types discussed above. A section of waveguide 100 connects the common ports C–D of diplexer hybrid junctions 90*a* and 90*b*. The transverse axis of connecting waveguide 100 is inclined at an angle of 45 degrees with respect to the transverse axis of ports 91 of diplexer hybrid junctions 90*a* and 90*b*. Resonant circuits 101 and 102 correspond to schematically illustrated circuits 25 and 26 of FIGURE 1. Circuits 101 and 102 may typically be resonant cavity structures coupled by means of aperture slots 102, 103 (as shown in FIGURE 14). These slots are centrally located in adjacent walls 104, 105 of waveguide 100, and coupled to the fields of the orthogonally related signals contained therein, in the manner well known in the art. Alternatively, other coupling means such as loops or probes may be used. Each of the resonant cavities 101, 102 contains an adjustable tuning control typically shown as the shorting plunger 106 of the contacting type, having contact fingers 107 for improved contact. Alternatively, other shorting plungers well known in the art, such as the choke type non-contacting plunger, may be employed. Alternatively, tuning screws or other appropriate tuning devices well known in the art may be used. The position of the shorting plunger 107 within the cavity is adjustable by means of a typical arrangement such as lead screw 108, connected to internally threaded adjustable knobs 109. By turning knobs 109, the location of shorting plungers 107 within the cavity may be varied, thereby adjusting the main resonant frequency. Lead screws 108 are shown secured to the ends of the cavities by bars 109, latched to the outer cavity walls at 110. This convenient arrangement permits the easy removal of the adjusting plungers. This is only a preferred manner of attachment, with it being understood that latches 110 may be replaced with a permanent type connection such as rivet screws, etc. Alternatively, lead screws 108 and knobs 109** may be replaced by a rack and gear arrangement, as frequently used in microwave tuners.

The cavity is tuned to half-wave resonance by adjustment of plunger position. For diplexer operation, as illustrated in FIGURE 1, resonant cavities 101, 102 will be adjusted to be a band stop filter at the receiver frequency or a band pass filter at the transmitter frequency, as discussed above in conjunction with FIGURE 4.

Waveguide port B of hybrid junction **90*a* is connected to the common receiver transmit antenna. Connecting waveguide 111 interconnects waveguide ports A of hybrid junction 90*a* and 90*d*, the latter being associated with the receiver filter, as shown by 40′ of FIGURE 1. Port B of hybrid 90*d* is connected to the receiver. Common port C–D of hybrid 90*d* is connected to waveguide section 114 whose transverse axis is at an angle of 45 degrees with respect to the transverse axis of port A. Resonant circuits 112, 113 correspond to circuits 49, 50 of FIGURE 1, and are preferably of the same construction as resonant circuits 101, 102** and are similarly tuned.

Figure 13:
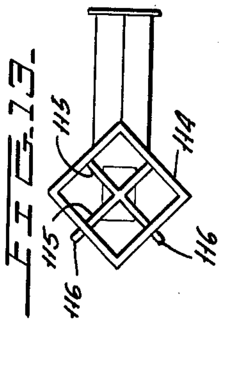

Dual mode connecting waveguide 114 of the receiver filter section is preferably terminated by a dual mode load, such as typically shown in FIGURE 13. Typically, such a dual mode load may consist of a crossed array of longitudinally placed dissipative dielectric vanes 115. These vanes may comprise a smoothly tapered contour in the plane of the vane, or alternatively a series of steps to accomplish a good match (over the operating frequency range) to be energy polarized in the plane of the vane, as is well known in the art. The use of such a dual mode load avoids the need of an additional waveguide transition connecting to a pair of single mode loads. The dual mode loads are well matched. However, reduction of the load mismatch to a very small degree is not necessary. Instead, adjustable tuning means, such as tuning posts 116 may be used to introduce a controllable magnitude of phase mismatch for each of the two loads. This will further permit individual compensation for any off frequency mismatch of the resonators 112, 113, and in addition permits fine adjustment of residual circuit unbalance.

Port A of diplexer hybrid **90*b* corresponds to port 22A of FIGURE 1, and is terminated by well-matched load 117. Load 117 typically may be a tapered ridge of dielectric dissipative material longitudinally placed along the center of the waveguide. Connecting guide 118 interconnects ports B of hybrid junctions 90*b* and 90*c*. Port A of transmitter hybrid junction 90*c* corresponds to port 41A of FIGURE 1. Common port C–D of 90*c* is connected to waveguide section 119 whose transverse axis is at an angle of 45 degrees with respect to the transverse axis of port B of that hybrid junction. Resonant circuits 120, 121 are preferably similarly constructed as resonant circuits 101, 102, but are tuned to reflect the transmitter frequency. Waveguide section 119 is terminated in a dual mode load, which is preferably constructed similar to load 115 of waveguide section 114**.

Resonant circuits 101, 102; 112, 113; and 120, 121 occur in matched pairs to facilitate tuning in the field. These pairs can be individually tuned for optimum transmission of a test signal. In the less critical applications, it is feasible to adjust the resonators to pre-calibrated settings. The adjustment of one pair will be independent of the adjustment of the other pairs because of the high degree of circuit isolation provided by the hybrid junctions.

It is thus seen that I have provided an improved diplexer circuit with filtering, wherein a novel hybrid junction permits an appreciable improvement in the operating characteristics. A practical working embodiment of this invention may be constructed for use in tropospheric scatter communication utilizing WR975 waveguide ports capable of handling 100 kw. of average power in the 755 to 965 megacycle range.

Although I have described preferred embodiments of my novel invention, many variations and modifications will now be obvious to those skilled in the art, and I prefer therefore to be limited not by the specific disclosure herein but only by the appended claims.

The embodiments of the invention in which an exclusive privilege or property is claimed are defined as follows:

1. A microwave circuit comprising a first and second hybrid; each of said hybrids including a first, second and third channel; said first and second channels terminating at said third channel; said first channel constructed to support a first wave signal; said second channel constructed to support a second wave signal; said second wave signal being orientated 90 degrees apart in space with respect to said first wave signal; said third channel constructed to support both of said first and second wave signals; a connecting guide means between the third channels of said first and second hybrids; the axis of said connecting guide means inclined 45 degrees with respect to the transverse axis of said third channel; and means to selectively couple to orthogonally resolved first and second components of said first and second wave signals in said connecting guid means; said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said second wave signal to said first and second orthogonally resolved component, said first wave channel, third channel and connecting guide means collectively defining an E-plane Tee; and said second wave channel, third channel and connecting guide means collectively defining an H-plane Tee.

2. A microwave circuit comprising a first and second hybrid; each of said hybrids including a first, second and third channel; said first and second channels terminating at said third channel; said first channel constructed to support a first wave signal; said second channel constructed to support a second wave signal; said second wave signal being orientated 90 degrees apart in space with respect to said first wave signal; said third channel constructed to support both of said first and second wave signals; a connecting guide means between the third channels of said first and second hybrids; means to selectively couple to first and second orthogonally resolved component of said first and second wave signals in said connecting guide means; and said connecting guide means including a portion having a transverse axis inclined at an angle of 45 degrees with respect to the transverse axis of said third channel; said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said second wave signal to said first and second orthogonally resolved component, said first wave channel, third channel and connecting guide means collectively defining an E-plane Tee; and said second wave channel, third channel and connecting guide means collectively defining an H-plane Tee.

3. A microwave circuit comprising a first and second hybrid; each of said hybrids including a first, second and third channel; said first and second channels terminating at said third channel; said first channel constructed to support a first wave signal; said second channel constructed to support a second wave signal; said second wave signal being orientated 90 degrees apart in space with respect to said first wave signal; said third channel constructed to support both of said first and second wave signals; a connecting guide means between the third channels of said first and second hybrids; the axis of said connecting guide means inclined 45 degrees with respect to the transverse axis of said third channel; means to selectively couple to first and second orthogonally resolved components of said first and second wave signals in said connecting guide means; and said first and second orthogonally resolved components orientated 45 degrees apart in space with respect to said first and second wave signals; said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said first wave signal to said first and second orthogonally resolved components, and in-phase components of said second wave signal to said first and second orthogonally resolved component, said first wave channel, third channel and connecting guide means collectively defining an H-plane Tee.

4. A microwave circuit comprising a first and second hybrid; each of said hybrids including a first, second and third channel; said first and second channels terminating at said third channel; said first channel constructed to support a first wave signal; said second channel constructed to support a second wave signal; said second wave signal being orientated 90 degrees apart in space with respect to said first wave signal; said third channel constructed to support both of said first and second wave signals; a connecting guide means between the third channels of said first and second hybrids; means to selectively couple to first and second orthogonally resolved components of said first and second wave signals in said connecting guide; said connecting guide means including a portion having a transverse axis inclined at an angle of 45 degrees with respect to the transverse axis of said third channel; and said first and second orthogonally resolved components orientated 45 degrees apart in space with respect to said first and second wave signals.

5. A microwave circuit comprising a first and second hybrid; each of said hybrids including a first, second and third channel; said first and second channels terminating at said third channel; said first channel constructed to support a first wave signal; said second channel constructed to support a second wave signal; said second wave signal being orientated 90 degrees apart in space with respect to said first wave signal; said third channel constructed to support both of said first and second wave signals; a connecting guide means between the third channels of said first and second hybrids; the axis of said connecting guide means inclined 45 degrees with respect to the transverse axis of said third channel; means to selectively couple to first and second orthogonally resolved components of said first and second wave signals in said connecting guide means; said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said second wave signal to said first and second orthogonally resolved component, said first wave channel, third channel and connecting guide means collectively defining an E-plane Tee; and said second wave channel, third channel and connecting guide means collectively defining an H-plane Tee; said coupling means including a frequency selective circuit to substantially reflect the orthogonally resolved components presented by one of said hybrids and substantially transmit the orthogonally resolved components presented by the other of said hybrids; and said frequency selective circuit including an adjustment means.

6. A microwave circuit comprising a first and second hybrid; each of said hybrids including a first, second and third channel; said first and second channels terminating at said third channel; said first channel constructed to support a first wave signal; said second channel constructed to support a second wave signal; said second wave signal being orientated 90 degrees apart in space with respect to said first wave signal; said third channel constructed to support both of said first and second wave signals; a connecting guide means between the third channels of said first and second hybrids; the axis of said connecting guide means inclined 45 degrees with respect to the transverse axis of said third channel; means to selectively couple to orthogonally resolved first and second components of said first and second wave signals in said connecting guide means; said orthogonally resolved first and second components orientated 45 degrees apart in space with respect to said first and second wave signals; said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said second wave signal to said first and second orthogonally resolved component, said first wave channel, third channel and connecting guide means collectively defining an E-plane Tee; and said second wave channel, third channel and connecting guide means collectively defining an H-plane Tee; said coupling means including a first and second resonant waveguide circuit; a first connection means coupling said first resonant waveguide circuit to one of said orthogonally resolved components at a first longitudinal position of said connecting guide; and a second connection means coupling said second resonant waveguide circuit to the other of said orthogonally resolved components at a second longitudinal position of said connecting guide; the longitudinal separation between said first and second coupling positions being operably related to the resonant frequency of at least one of said first and second resonant waveguide circuits; and said resonant waveguide circuits including means for adjustment to substantially reflect the orthogonally resolved components presented by one of said hybrids and substantially transmit the orthogonally resolved components presented by the other of said hybrids.

7. A microwave circuit comprising a first, second and third hybrid; each of said hybrids including a first, second and third channel; said first and second channels terminating at said third channel; said first channel constructed to support a first wave signal; said second channel constructed to support a second wave signal; said second wave signal being orientated 90 degrees apart in space with respect to said first wave signal; said third channel constructed to support both of said first and second wave signals; a first connecting guide means between the third channels of said first and second hybrids; the axis of said connecting guide means inclined 45 degrees with respect to the transverse axis of said third channel; a second connecting guide means between the first channel of said third hybrid and the first channel of one of said first and second hybrids; a first coupling means to selectively couple to first and second orthogonally resolved components of said first and second wave signals in said first connecting guide means; a third connecting guide means between the third channel of said third hybrid; a second coupling means selectively coupling to first and second orthogonally resolved components of said first and second wave signals in said third connecting means, and all of said orthogonally resolved components orientated 45 degrees apart in space with respect to said first and second wave signals; each of said hybrids being characterized in that said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said second wave signal to said first and second orthogonally resolved component, said first wave channel, third channel and connecting guide means collectively defining an E-plane Tee; and said second wave channel, third channel and connecting guide means collectively defining an H-plane Tee.

8. A microwave circuit comprising a first, second, third and fourth hybrid; each of said hybrids including a first, second and third channel; said first and second channels terminating at said third channel; said first channel constructed to support a first wave signal; said second channel constructed to support a second wave signal; said second wave signal being orientated 90 degrees apart in space with respect to said first wave signal; said third channel constructed to support both of said first and second wave signals; a first connecting guide means between the third channels of said first and second hybrids; a second connecting guide means between the first channel of said third hybrid and the first channel of one of said first and second hybrids; a first coupling means to selectively couple to first and second orthogonally resolved components of said first and second wave signals in said first connecting guide means; a third connecting guide means between the third channel of said third hybrid; a second coupling means selectively coupling to first and second orthogonally resolved components of said first and second wave signals in said third connecting guide means; a fourth connecting guide means between the first channel of said fourth hybrid and the first channel of the other of said first and second hybrids; a fifth connecting guide means between the third channel of said fourth hybrid; a third coupling means selectively coupling to first and second orthogonally resolved components of said first and second signals in said fifth connecting guide means; each of said connecting guide means including a portion having a transverse axis inclined at an angle of 45 degrees with respect to the transverse axis of at least one of the channels of the hybrid connected thereto; each of said hybrids being characterized in that said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said second wave signal to said first and second orthogonally resolved component, said first wave channel, third channel and connecting guide means collectively defining an E-plane Tee; and said second wave channel, third channel and connecting guide means collectively defining an H-plane Tee.

9. A microwave circuit comprising a plurality of hybrids; each of said hybrids including a first, second and third channel; said first and second channels terminating at said third channel; said first and second channels constructed to support orthogonally related first and second wave signals respectively; said third channel constructed to combinedly support said first and second wave signals; a plurality of connecting guide means; each of said connecting guide means connected to at least one of said hybrids and including a portion having a transverse axis inclined at an angle of 45 degrees with respect to the transverse axis of at least one of the channels of its connected one of said hybrids; at least one of said connecting guide means including a means to selectively couple to first and second orthogonally resolved components of said first and second wave signals therein; and one of said orthogonally resolved components being parallel to the transverse axis of said 45 degree inclined portion of its associated connecting guide means; each of said hybrids being characterized in that said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said second wave signal to said first and second orthogonally resolved component, said first wave channel, third channel and connecting guide means collectively defining an E-plane Tee; and said second wave channel, third channel and connecting guide means collectively defining an H-plane Tee.

10. A waveguide hybrid comprising a first, second and third channel; said first channel constructed to support a first wave signal; said second channel constructed to support a second wave signal; said first and second channels coupling to said third channel; said third channel constructed to combinedly support said first and second wave signals in an orthogonal relationship; means selectively coupling to first and second orthogonally resolved components of said first and second wave signals; said orthogonally resolved components inclined with respect to said first and second wave signals; said first wave signal orientated substantially perpendicular to the transverse axis of said third channel; a third channel connecting guide means including a portion having a transverse axis inclined at an angle of 45 degrees with respect to the transverse axis of said third channel; and said connecting guide means portion including said selective coupling means; said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said second wave signal to said first and second orthogonally resolved component, said first wave channel, third channel and connecting guide means collectively defining an E-plane Tee; and said second wave channel, third channel and connecting guide means collectively defining an H-plane Tee.

11. A waveguide hybrid comprising a first, second and third channel; said first and second channels constructed and space orientated to support orthogonally related first and second wave signals of a similar frequency; said third channel constructed to combinedly support said first and second wave signals coupled thereto; a connecting guide means inclined 45 degrees with respect to the polarization of said first and second wave signals; said connecting guide means constructed to combinedly support similarly inclined first and second orthogonally related resolved components of said first and second wave signals; and a first and second frequency selective coupling means, each coupling to one of said orthogonally related resolved components; said first orthogonally resolved component parallel to the transverse axis of said connecting guide means, and reciprocally including in-phase components of said first and second wave signals; said second orthogonally resolved component perpendicular to the transverse axis of said connecting guide means and reciprocally including an out-of-phase component of said first wave signal and an in-phase component of said second wave signal, such that said hybrid providing out-of-phase components of said first wave signal to said first and second orthogonally resolved components, and in-phase components of said second wave signal to said first and second orthogonally resolved component, said first wave channel, third channel and connecting guide means collectively defining an E-plane Tee; and said second wave channel, third channel and connecting guide means collectively defining an H-plane Tee.

12. In combination in a microwave circuit; a receiver, transmitter, common antenna, and a plurality of microwave hybrids, each of said hybrids comprising a first, second and third channel; said first channel constructed to support an individual first wave signal; said second channel constructed to support an individual second wave signal; said first and second channels coupling to said third channel; said third channel constructed to combinedly support said first and second wave signals in an orthogonal relationship; guide means connected to said third channel and having an axis inclined 45 degrees with respect to the transverse axis of said third channel; means selectively coupling to orthogonally resolved components of said first and second wave signals; said orthogonally resolved components inclined with respect to said first and second wave signals; said receiver coupled to an individual signal channel of one of said hybrids; said transmitter coupled to an individual signal channel of another of said hybrids; a first connecting guide means between the third channels of said receiver and transmitter hybrids; said first connecting guide means including said selective coupling means; and said selective coupling means including means for frequency adjustment to effect substantially different transmission characteristics to said receiver and transmitter frequencies.

13. In combination in a microwave circuit, a receiver, transmitter, common antenna, and a plurality of microwave hybrids, each of said hybids comprising a first, second and third channel; said first channel constructed to support an individual first wave signal; said second channel constructed to support an individual second wave signal; said first and second channels coupling to said third channel; said third channel constructed to combinedly support said first and second wave signals in an orthogonal relationship; guide means connected to said third channel and having an axis inclined 45 degrees with respect to the transverse axis of said third channel; means selectively coupling to orthogonally resolved components of said first and second wave signals; said orthogonally resolved components inclined with respect to said first and second wave signals; said receiver coupled to an individual signal channel of one of said hybrids; said transmitter coupled to an individual signal channel of another of said hybrids; a pair of hybrids interposed between said receiver and transmitter hybrids; a first connecting guide means between the third channels of said interposed pair of hybrids; and said first connecting guide means including a first selective coupling means.

14. In combination in a microwave circuit, a receiver, transmitter, common antenna, and a plurality of microwave hybrids, each of said hybrids comprising a first, second and third channel; said first channel constructed to support an individual first wave signal; said second channel constructed to support an individual second wave signal; said first and second channels coupling to said third channel; said third channel constructed to combinedly support said first and second wave signals in an orthogonal relationship; guide means connected to said third channel and having an axis inclined 45 degrees with respect to the transverse axis of said third channel; means selectively coupling to orthogonally resolved components of said first and second wave signals; said orthogonally resolved components inclined with respect to said first and second wave signals; said receiver coupled to an individual signal channel of one of said hybrids, said transmitter coupled to an individual signal channel of another of said hybrids; a pair of hybrids interposed between said receiver and transmitter hybrids; a first connecting guide means between the third channels of said interposed pair of hybrids; said first connecting guide means including a first selective coupling means; said first selective coupling means including a first and second longitudinally separated connection means, a first and second resonant circuit respectively, coupled thereto, and means to adjust the resonant frequency thereof; the longitudinal separation of said coupling connection means being operably related to the resonant frequency of at least one of said resonant circuits; said first coupling means resonant circuits being adjusted to substantially transmit said transmitter frequency, while substantially reflecting said receiver frequency; a second selective coupling means connected to the third channel of said receiver hybrid; said second selective coupling means being adjusted to substantially transmit said transmitted frequency while substantially reflecting said receiver frequency; a third selective coupling means connected to the third channel of said transmitter hybrid; said third selective coupling means being adjusted to substantially transmit said receiver frequency, while substantially reflecting said transmitter frequency.

References Cited by the Examiner

UNITED STATES PATENTS

| | | | |
|---|---|---|---|
| 2,561,212 | 7/1951 | Lewis | 331—11 |
| 2,965,898 | 12/1960 | Lewis | 343—756 |
| 3,004,228 | 10/1961 | Fogel | 333—9 |

OTHER REFERENCES

Robertson: "The Ultra-Bandwidth Finline Coupler." Proceedings of the I.R.E., June 1955, pages 739–741.

HERMAN KARL SAALBACH, *Primary Examiner.*